(12) United States Patent
Hull

(10) Patent No.: US 11,072,905 B2
(45) Date of Patent: Jul. 27, 2021

(54) SOIL-LIKE MATERIAL AND METHOD OF MAKING A BARRIER FOR CONTAINING WASTE

(71) Applicant: AquaBlok, Ltd., Swanton, OH (US)

(72) Inventor: John H. Hull, Ottawa Hills, OH (US)

(73) Assignee: AquaBlok, Ltd., Swanton, OH (US)

( * ) Notice: Subject to any disclaimer, the term of this patent is extended or adjusted under 35 U.S.C. 154(b) by 0 days.

(21) Appl. No.: 16/090,882

(22) PCT Filed: Apr. 3, 2017

(86) PCT No.: PCT/US2017/025740
§ 371 (c)(1),
(2) Date: Oct. 3, 2018

(87) PCT Pub. No.: WO2017/176632
PCT Pub. Date: Oct. 12, 2017

(65) Prior Publication Data
US 2019/0330111 A1  Oct. 31, 2019

Related U.S. Application Data

(60) Provisional application No. 62/317,905, filed on Apr. 4, 2016.

(51) Int. Cl.
*E02D 3/12* (2006.01)
*E02D 31/00* (2006.01)
(Continued)

(52) U.S. Cl.
CPC ......... *E02D 31/002* (2013.01); *E02D 31/004* (2013.01); *B32B 9/005* (2013.01);
(Continued)

(58) Field of Classification Search
CPC ...... E02D 31/00; E02D 31/002; E02D 31/004
See application file for complete search history.

(56) References Cited

U.S. PATENT DOCUMENTS

| | | | | |
|---|---|---|---|---|
| 4,224,003 A | * | 9/1980 | St. Louis | E02D 3/046 37/904 |
| 4,528,129 A | * | 7/1985 | Manchak | G21F 9/162 588/9 |

(Continued)

FOREIGN PATENT DOCUMENTS

CL  200301700  2/2002

OTHER PUBLICATIONS

Hydraulic Conductivity and Landfill Construction Stepniewski et al., www.intechopen.com, 2011.*

(Continued)

*Primary Examiner* — Janine M Kreck
(74) *Attorney, Agent, or Firm* — MacMillan, Sobanski & Todd, LLC

(57) ABSTRACT

The invention relates to a low-permeability geotechnical barrier material including a blend of approximately equal parts of: aggregate particles, sand-size particles and manufactured composite particles that include a hydratable sealant material composed of naturally-occurring clay minerals and/or polymer-enhanced clay minerals, such that the actual percentage of clay mineral component is less than 10% by weight in the blended material. In a particular embodiment, the construction of a low-permeability geotechnical barrier using predominantly coarse grain materials by conventional compaction efforts is rarely attempted due to the difficulty of maintaining a uniform mix of well-graded sand and aggregate blends necessary to achieve low permeability. The regularly achievable permeability offered by this material blend when installed with specific proscribed techniques using conventional equipment can be $5 \times 10^{-8}$ cm/sec or lower.

22 Claims, 6 Drawing Sheets

(51) Int. Cl.
  *B32B 9/00* (2006.01)
  *C04B 14/06* (2006.01)
  *C04B 20/00* (2006.01)
  *C04B 20/10* (2006.01)
  *C04B 28/00* (2006.01)
  *C04B 111/00* (2006.01)

(52) U.S. Cl.
  CPC .......... *C04B 14/06* (2013.01); *C04B 20/0048* (2013.01); *C04B 20/1077* (2013.01); *C04B 28/001* (2013.01); *C04B 2111/00293* (2013.01); *C04B 2111/00775* (2013.01); *E02D 2250/00* (2013.01); *E02D 2300/0043* (2013.01); *E02D 2300/0051* (2013.01); *E02D 2300/0079* (2013.01); *E02D 2300/0085* (2013.01)

(56) References Cited

U.S. PATENT DOCUMENTS

| | | | |
|---|---|---|---|
| 5,746,546 A | 5/1998 | Hubbs et al. | |
| 5,849,364 A * | 12/1998 | Nachtman | B01F 5/106 427/407.1 |
| 6,386,796 B1 * | 5/2002 | Hull | B09C 1/00 405/128.1 |
| 2007/0113756 A1 * | 5/2007 | Hull | C04B 20/1055 106/811 |
| 2013/0196061 A1 * | 8/2013 | Hull | C04B 28/001 427/180 |
| 2014/0037379 A1 | 2/2014 | Ng et al. | |

OTHER PUBLICATIONS

Roberts, A. A. (2007). Engineering Characteristics of Bentonite Coated Gravel As a Hydraulic Barrier for Waste Disposal Facilities (Doctoral dissertation).
PCT International Search Report and Written Opinion, Application No. PCT/US17/25740, dated Jun. 27, 2017.
EP European Search Report, Application No. 17779595.2, dated Oct. 25, 2019.
Chilean Office Action, Application No. 201802816, dated Jan. 13, 2020.

* cited by examiner

| AASHTO Soil Classification System (from AASHTO M 145 or ASTM D3282) ||||||||||||
|---|---|---|---|---|---|---|---|---|---|---|---|
| General Classification | Granular Materials (35% or less passing the 0.075 mm sieve) |||||||| Silt-Clay Materials (>35% passing the 0.075 mm sieve) |||
| Group Classification | A-1 || A-3 | A-2 |||| A-4 | A-5 | A-6 | A-7 |
| | A-1-a | A-1-b | | A-2-4 | A-2-5 | A-2-6 | A-2-7 | | | | A-7-5 A-7-6 |
| Sieve Analysis, % passing | | | | | | | | | | | |
| 2.00 mm (No. 10) | 50 max | ... | ... | ... | ... | ... | ... | ... | ... | ... | ... |
| 0.425 (No. 40) | 30 max | 50 max | 51 min | ... | ... | ... | ... | ... | ... | ... | ... |
| 0.075 (No. 200) | 15 max | 25 max | 10 max | 35 max | 35 max | 35 max | 35 max | 36 min | 36 min | 36 min | 36 min |
| Characteristics of fraction passing 0.425 mm (No. 40) | | | | | | | | | | | |
| Liquid Limit | ... || ... | 40 max | 41 min | 40 max | 41 min | 40 max | 41 min | 40 max | 41 min |
| Plasticity Index | 6 max || N.P. | 10 max | 10 max | 11 min | 11 min | 10 max | 10 max | 11 min | 11 min[1] |
| Usual types of significant constituent materials | stone fragments, gravel and sand || fine sand | silty or clayey gravel and sand |||| silty soils || clayey soils ||
| General rating as a subgrade | excellent to good |||||||| fair to poor |||

Fig. 1A

| UNIFIED SOIL CLASSIFICATION AND SYMBOL CHART | | | LABORATORY CLASSIFICATION CRITERIA | |
|---|---|---|---|---|
| COARSE-GRAINED SOILS (more than 50% of material is larger than No. 200 sieve size.) | | | | |
| GRAVELS More than 50% of coarse fraction larger than No. 4 sieve size | Clean Gravels (Less than 5% fines) | GW | Well-graded gravels, gravel-sand mixtures, little or no fines | GW | $C_u = \dfrac{D_{60}}{D_{10}}$ greater than 4; $C_c = \dfrac{D_{30}^2}{D_{10} \times D_{60}}$ between 1 and 3 |
| | | GP | Poorly-graded gravels, gravel-sand mixtures, little or no fines | GP | Not meeting all gradation requirements for GW |
| | Gravels with fines (More than 12% fines) | GM | Silty gravels, gravel-sand-silt mixtures | GM | Atterberg limits below "A" line or P.I. less than 4 | Above "A" line with P.I. between 4 and 7 are borderline cases requiring use of dual symbols |
| | | GC | Clayey gravels, gravel-sand-clay mixtures | GC | Atterberg limits above "A" line with P.I. greater than 7 | |
| SANDS 50% or more of coarse fraction smaller than No. 4 sieve size | Clean Sands (Less than 5% fines) | SW | Well-graded sands, gravelly sands, little or no fines | SW | $C_u = \dfrac{D_{60}}{D_{10}}$ greater than 4; $C_c = \dfrac{D_{30}^2}{D_{10} \times D_{60}}$ between 1 and 3 |
| | | SP | Poorly graded sands, gravelly sands, little or no fines | SP | Not meeting all gradation requirements for GW |
| | Sands with fines (More than 12% fines) | SM | Silty sands, sand-silt mixtures | SM | Atterberg limits below "A" line or P.I. less than 4 | Limits plotting in shaded zone with P.I. between 4 and 7 are borderline cases requiring use of dual symbols. |
| | | SC | Clayey sands, sand-clay mixtures | SC | Atterberg limits above "A" line with P.I. greater than 7 | |

Fig. 1B (part 1 of 2)

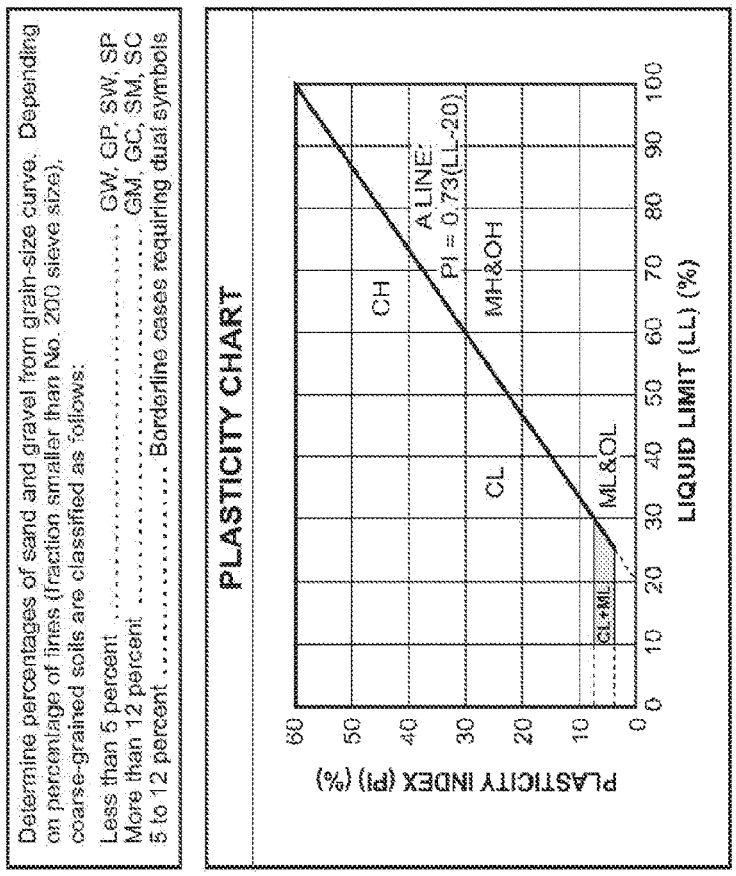
Fig. 1B (part 2 of 2)

| K (cm/s) | $10^2$ | $10^1$ | $10^0$=1 | $10^{-1}$ | $10^{-2}$ | $10^{-3}$ | $10^{-4}$ | $10^{-5}$ | $10^{-6}$ | $10^{-7}$ | $10^{-8}$ | $10^{-9}$ | $10^{-10}$ |
|---|---|---|---|---|---|---|---|---|---|---|---|---|---|
| K (ft/day) | $10^5$ | 10,000 | 1,000 | 100 | 10 | 1 | 0.1 | 0.01 | 0.001 | 0.0001 | $10^{-5}$ | $10^{-6}$ | $10^{-7}$ |
| Relative Permeability | Pervious ||| Semi-Pervious ||| Impervious |||||||
| Aquifer | Good |||| Poor ||| None ||||||
| Unconsolidated Sand & Gravel | | Well Sorted Gravel || Well Sorted Sand or Sand & Gravel || Very Fine Sand, Silt, Loess, Loam ||| | | | | |
| Unconsolidated Clay & Organic | | | | | | Peat || Layered | Clay | Fat / Unweathered Clay ||||
| Consolidated Rocks | | Highly Fractured Rocks ||| Oil Reservoir Rocks || Fresh | Sand-stone | Fresh Limestone, Dolomite ||| Fresh Granite |

Source: modified from Bear, 1972

L

Highly Fractured Rocks

Fig. 4

SOIL-LIKE MATERIAL AND METHOD OF MAKING A BARRIER FOR CONTAINING WASTE

This is a national phase application of international application PCT/US17/25740, filed under the authority of the Patent Cooperation Treaty on Apr. 3, 2017, published; which claims priority to U.S. Provisional Application No. 62/317,905, filed under 35 U.S.C. § 111(b) on Apr. 4, 2016. The entire disclosures of the aforementioned applications are expressly incorporated herein by reference for all purposes.

BACKGROUND OF THE INVENTION

The present invention relates to a novel predominantly aggregate, soil-like material and to improved methods using this material to construct barrier layers useful for containing waste material, particularly in geological areas that lack fine-grained, cohesive soils sufficiently impermeable to form traditional barriers, such as mining sites.

Soils are traditionally classified by a number of criteria, including: (a) grain or particle size (e.g. coarse or fine); (b) grain size distribution (e.g. well-graded or poorly-graded, and including the presence or absence of fines); and, (c) for finer-grained soils, also on the basis of properties that vary depending the impact of moisture content (e.g. plasticity index, liquid limit, and other Atterberg limits). The classes are given specific descriptive names based on these criteria. The American Association of State Highway and Transportation Officials (AASHTO) Soil Classification System and the Unified Soil Classification System (USCS) are two well established systems for classifying soils. These are represented in FIGS. 1A and 1B, respectively. The USCS will be used herein to refer to various soil types.

Traditionally low permeability barriers to minimize fluid transport in landfills, reservoirs and dams have been constructed of natural clayey fine-grained soils classified as CL, ML, or SC soils. In some circumstances, natural soils are augmented by amending them with other clay minerals such as montmorillonite to increase the fine-grained soil percentages, thus reducing the permeability of the material. Re-compacted soil liner systems constructed using fine-grained soils can be difficult and expensive to construct. Additionally, many geological sites, such as mining applications, are devoid of suitable local fine-grained soils and have instead great quantities of overburden, waste rock, and tailings that must be disposed of. And because mining operations often exist in remote areas, there are logistical and cost challenges to transporting large quantities of suitable compactable soils into the site, and transporting the waste materials away from the site.

Additionally, synthetic liner systems such as high-density polyethylene flexible membrane liners without suitable soil liners are often subject to dramatic failure over time as a result of settlement induced shear stresses, particularly when the overlaying waste products are aggregates themselves, with sub-angular to angular shapes that can exacerbate, puncture or tear membrane liner systems.

US Patent Publication 2013/0272795 describes the use of composite particles (AquaBlok®) in landfill covers. U.S. Pat. No. 7,438,500 to Hull discloses barrier layers comprising a blend (BlendedBarrier™) of aggregate particles and manufactured composite particles (AquaBlok®) in approximately 50% to 50% (1:1) ratio, by weight. These barrier layers may form an underwater barrier cap that is very impermeable to water and erosion resistant. The low water permeability prevents contaminants in an underwater surface from moving by advection into the overlying water column. The AquaBlok® material is self-compacting when hydrated with water and can achieve permeabilities into the $10^{-9}$ cm/sec range. However, the remoteness of waste sites and mining sites often present the same logistical challenges transporting large quantities of composite particles.

Beyond the lack of availability, a further problem with the use of clayey fine-grained, cohesive soils classified as CL, ML, or SC, is that they may not have the shear strength to stand up to the significant overburden loads often encountered in mine tailing or spoil sites. The very soil properties that contribute to relative impermeability are those that also contribute to high plasticity and moldability. Additionally, under greater normal pressures (loads) granular materials exhibit a much greater shear strength than fine-grained cohesive soils typically used in re-compacted soil liners.

Furthermore, if powdered clay such as bentonite or attapultite is simply mixed with aggregate and sand in an attempt to seal up the air gaps to form an impermeable layer, the vibration occurring during the placement and compaction of the layers will tend to segregate the bentonite and other fines present to the lower portions of the layer, creating a non-homogeneous barrier susceptible to leakage. Typical aggregate and sand blends with low clay content can rarely achieve compacted permeabilities lower than $1 \times 10^{-6}$ cm/sec.

It would therefore be advantageous to form impermeable barrier layers at remote geological sites using predominantly locally available aggregates and sands (or other fine-grained soils), which serves both to make use of readily available site-specific materials as well as to minimize importation of manufactured materials.

SUMMARY OF THE INVENTION

The invention relates to a novel artificial soil-like material have unique properties. In a first aspect, the invention relates to a man-made, soil-like material of low permeability, comprising about 20 to about 50 wt % coarse aggregate having AASHTO standard size number from 4 to 10;

about 20 to about 50 wt % fine particulates;

about 20 to about 40 wt % of a composite particle, the composite particle having an aggregated core coated with a hydratable coating layer of swellable clay;

the soil-like material having a permeability of $1 \times 10^{-7}$ cm/sec or less when compacted to within about 95% of its maximum dry density at an optimum moisture content using a Standard Proctor Density or 90% using a Modified Proctor Density.

In another aspect, the invention relates to barrier layers or liner comprising the artificial soil-like material described above compacted to a density that will achieve a desired permeability.

In another aspect, the invention relates to a method of making barrier layers or liner comprising the artificial soil-like material described above, by applying a plurality of loose lifts of the soil-like material of claim 1 to a base foundation; adding moisture to each lift loose lift; and compacting each lift to within about 90% or 95% of its maximum dry density prior to applying the subsequent loose lift.

In another aspect, the invention relates to a method of containing contaminated waste materials using cap and/or liner barrier layer comprising the artificial soil-like material described above. Exemplary contaminated wastes include mine tailings.

Other features and advantages of the invention will be apparent from the detailed description that follows.

BRIEF DESCRIPTION OF THE DRAWINGS

The accompanying drawings, incorporated herein and forming a part of the specification, illustrate the present invention in its several aspects and, together with the description, serve to explain the principles of the invention. In the drawings, the thickness of the lines, layers, and regions may be exaggerated for clarity.

FIGS. 1A and 1B are representations of the AASHTO and USCS soil classifications systems, respectively.

FIG. 4 is Table A, showing the hydraulic conductivity of selected soils.

DETAILED DESCRIPTION OF THE INVENTION

Figure 2A:
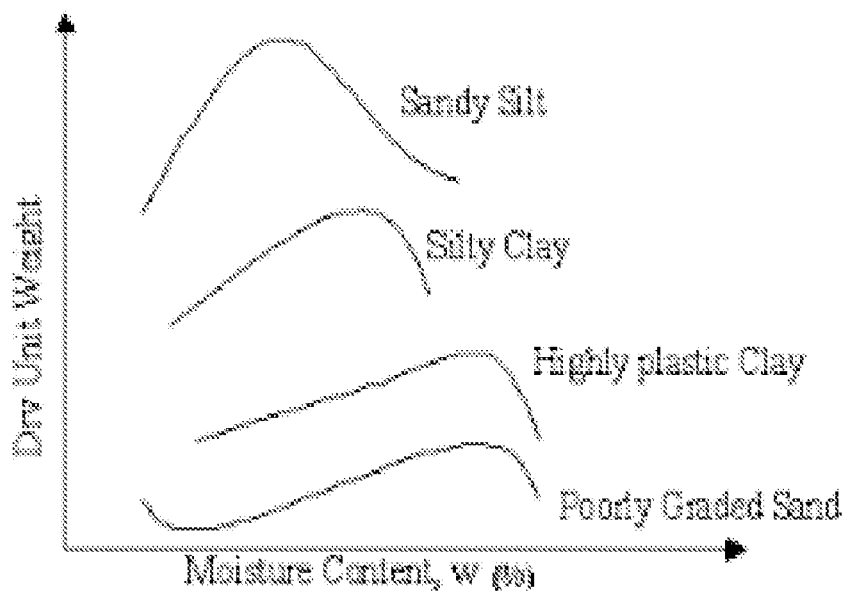
FIGS. 2A and 2B are generalized Proctor compaction curves.

The invention relates methods of using composite particles to install a barrier layer over or under the contaminated waste typically found at mining locations such as mine tailings, ore refining by-products that, when exposed to precipitation, can create contaminated flows that could adversely impact ground or surface waters.

Those of ordinary skill in the art will realize that the following detailed description of the embodiments is illustrative only and not intended to be in any way limiting. Other embodiments will readily suggest themselves to such skilled persons having the benefit of this disclosure. Reference to an "embodiment," "aspect," or "example" herein indicate that the embodiments of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including books, journal articles, published U.S. or foreign patent applications, issued U.S. or foreign patents, and any other references, are each incorporated by reference in their entireties, including all data, tables, figures, and text presented in the cited references.

Numerical ranges, measurements and parameters used to characterize the invention—for example, angular degrees, quantities of ingredients, polymer molecular weights, reaction conditions (pH, temperatures, charge levels, etc.), physical dimensions and so forth—are necessarily approximations; and, while reported as precisely as possible, they inherently contain imprecision derived from their respective measurements. Consequently, all numbers expressing ranges of magnitudes as used in the specification and claims are to be understood as being modified in all instances by the term "about." All numerical ranges are understood to include all possible incremental sub-ranges within the outer boundaries of the range. Thus, a range of 30 to 90 units discloses, for example, 35 to 50 units, 45 to 85 units, and 40 to 80 units, etc. Unless otherwise defined, percentages are wt/wt %.

Additionally, precise formulations may be expected to vary to reflect specifics of locally-sourced aggregates and soils targeted for use in producing the product.

Soil Physical Properties and Test Standards

Many soil properties are dependent on the grain or particle size of the soil. The AASHTO and USCS (See FIGS. 1A and 1B) illustrate this. The first pass in both systems is determination of particle size and size distribution which is done by sieving. In general, the larger the particle size, the larger the air gaps are between particles, resulting in a more permeable material. Well-graded soils are those having broader size distributions, so that all sizes within the range limits are represented. In contrast, poorly-graded soils (also called "uniformly-graded") are those having a tighter size distribution. Soils are graded in this fashion by the parameters "coefficient of uniformity," $C_u$, and the "coefficient of curvature," $C_c$, both of which are determined according to formulas based on the grain diameters at various % passing rates. For a given particle size range, a well-graded soil is less permeable, because the smaller sized particles are better able to fill air gaps between larger size particles. To an extent, fines, if present in higher quantities, also fill gaps and contribute to impermeability.

Permeability is defined as hydraulic conductivity and is that rate at which water flows through a soil. It is measured in cm/sec or sometimes ft/day, and is dependent on the pressure gradient applied to the sample. ASTM Standard D5084, Hydraulic Conductivity of Saturated Porous Materials Using a Flexible Wall Permeameter, gives details of the measurement. Table A in FIG. 4 provides the Groundwater permeabilities of some naturally occurring soils.

While hydraulic conductivity is obviously a continuum of more than 10 orders of magnitude, for purposes of this invention, a material is considered "impermeable" if it has a hydraulic conductivity of $1 \times 10^{-6}$ cm/sec or less (e.g. to the right of the line labeled L), and permeable if the conductivity is greater than $1 \times 10^{-6}$ cm/sec (left of the line labeled L). The notations $1 \times 10^{-n}$ and 10E-n are understood to equivalent expressions of the same number.

For the dual purpose of containing the leachates of waste materials and/or to minimize the infiltration of precipitation that can result in leachate production, a permeability of $1 \times 10^{-7}$ cm/sec or less is desirable. It will be understood that using highly impermeable caps and liners can result in reducing the thickness of the overall cap and/or liner without loss of performance, thereby potentially reducing costs. From Table A (FIG. 4), it can be seen that very few natural soils have sufficient impermeability to form barriers for waste.

A number of methods may be used to determine the water content of soils. In the laboratory, a microwave heating method is used according to: Determination of Water Content of Soil by Microwave Oven Heating (ASTM D4643). In the field, in situ soil samples may be analyzed—even under compacting—for density (i.e. unit weight) and water content by: Density and Water Content of Soil and Soil-Aggregate in Place by Nuclear Methods (ASTM D6938). Density and Unit Weight of Soils Using Sand Cone Method (ASTM D1556) is an alternate test method utilized during compaction testing to determine the in-situ soil density and unit weight.

Laboratory Compaction Characteristics of Soil Using Standard Effort (ASTM D698-12) is a laboratory test method commonly referred to as a Standard Proctor test. It is a method of experimentally determining the optimal moisture content (OMC) in wt % at which a given soil type will become most dense and achieve its maximum dry density (MDD), measured in pounds/cubic foot, given a fixed energy input. A Modified Proctor Test (ASTM D1557-09) is a very similar test, but uses a much higher force or energy effort to compact the sample. These tests consist of compacting soil at known moisture content into a cylindrical mold using a controlled pattern of strikes of known effort. The process is repeated for other moisture contents and the densities after drying are plotted against moisture content to establish the compaction curve. The MDD is obtained from the peak point of the compaction curve; its corresponding moisture content is known as the optimal moisture content (OMC).

Figure 2B:
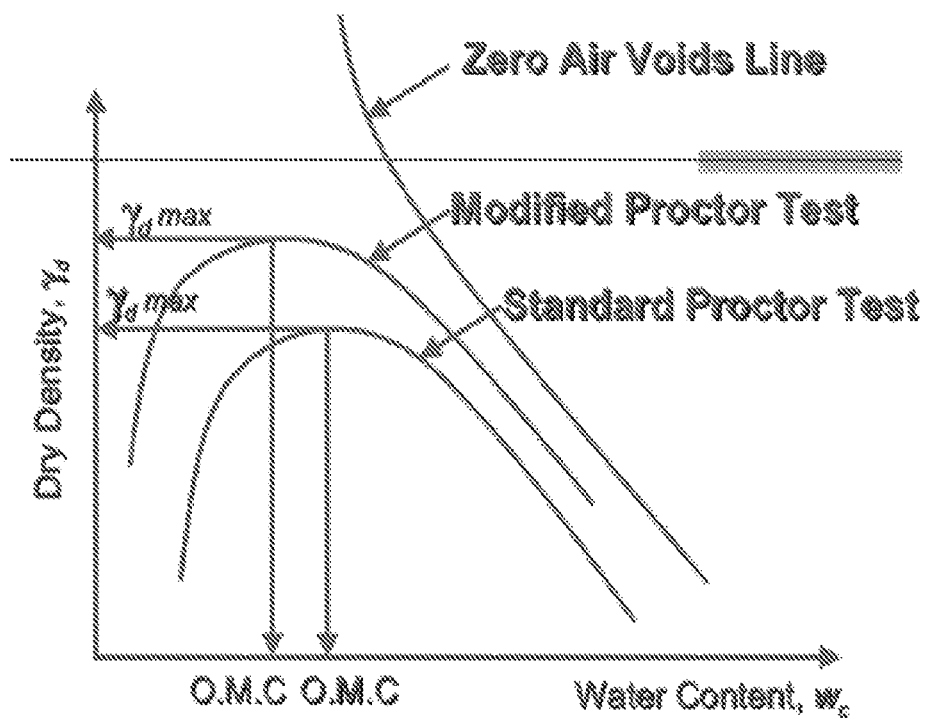

FIG. 2A is a representative Proctor compaction curve for soils of varying types. It suggests that, of the four types, the highest MDD is achievable with sandy silts at the lowest OMC, followed second by silty clays. Conversely, the lowest MDD was achieved by poorly-graded sands. FIG. 2B is a similar chart indicating the expected relative results comparing a Modified Proctor test with a Standard Proctor test.

Unique Soil-Like Blended Material

The term "soil-like material" as used herein refers to a blend of three predominantly aggregate materials that produces a novel soil-like material with unique properties. The three aggregate materials are: (1) coarse-grained aggregate; (2) fine-grained particulate material, such as sand; and (3) composite particles, such as AquaBlok® particles, that are typically an aggregate core coated with a clay mineral coating. Each of the three main ingredients is discussed in more detail in sections below.

The ratios of the three ingredients are variable depending on the availability of site-specific materials and the desired properties. Table B below provides some ranges and typical examples of useful blend ratios. In Table B, the clay is assumed to be ~20 wt % of the composite particle and is reported in the Table as a wt % of the total blend weight; it is encompassed within, not additive to, the wt % of the composite particle.

TABLE B

| Blend Composition Ratios (by weight %) | | | | | | |
|---|---|---|---|---|---|---|
| Ingredient | Range | Ex. 1 | Ex. 2 | Ex. 3 | Ex. 4 | Ex. 5 |
| Coarse Aggregate | 20-50 | 35 | 30 | 32.5 | 30 | 35 |
| Fine particulate | 20-60 | 35 | 30 | 32.5 | 40 | 25 |
| Composite Particle | 20-50 | 30 | 40 | 35 | 30 | 40 |
| % clay | | ~6 | ~8 | ~7 | ~6 | ~8 |

The coarse aggregate and fine particulates are preferably readily available, site-specific materials or can be prepared therefrom. The composite particles may be prepared according to the literature described herein. Blending them is a simply matter of co-blending all three materials from load-cell hoppers, using conveyor loading directly into a mixing hopper, which directly discharges into a placement conveyor traversing the surface over which the barrier is to be constructed.

The soil-like material may be characterized by several features. Being soil-like, they may be classified as soils are, using, e.g. the USCS System described in FIG. 1B, which is largely followed for the classification of soils for engineering purposes (ASTM D2487). Based on grain-size analysis according to this system, the soil-like material of the invention can be characterized as a non-plastic, granular material, being composed of a poorly-graded sand with silt and gravel (SP-SM), poorly-graded sand with gravel (SP), well-graded sand with silt and gravel (SW-SM).

Since they are particulate materials, gradation of the three ingredient materials is applicable, just as it is to soils. For example, a uniformly (poorly)-graded aggregate might go better with a well-graded sand, or vice versa. The composite particles tend to be more uniformly-graded, but may be matched with well-graded or uniformly (poorly)-graded aggregate and/or well-graded or uniformly (poorly)-graded fine particulates. Relative to the composite particle component, size and volume might be varied based on relative sand/soil content and type.

The novel soil-like material of the invention may also be characterized by the size distribution of the aggregates. Because the material is predominantly a coarse grained product, in some embodiments, about 50% or more of the material will be retained by a #50 sieve. In some embodiments, about 70% or more, for example 80% or more, is retained by a #100 sieve. In some embodiments, about 80% or more, for example 90% or more, is retained by a #200 sieve. As a result of its coarse nature, the material is expected to have shear strength properties similar to a granular material (e.g., relatively small cohesion and larger internal friction angle).

The shear strength of soil (i.e., the magnitude of the shear stress a soil can sustain) depends on the effective stress, the drainage conditions, the density of the particles, and the rate of strain. The shear resistance of soil is a result of friction and interlocking of particles. Due to this interlocking, soil particles may expand or contract in volume as it is subject to shear strains. If soil expands its volume, the density of particles will decrease and the strength will decrease. Based on observations from the permeability testing completed on soil-like material, it does not appear the material exhibited volume changes/expansion and appears to have consolidated with an increase in confining pressures (tested up to approximately 100 psi). This suggests there is substantial particle-to-particle contact, thus providing a relatively high friction angle (e.g., like granular material), which is corroborated by the fact that the product is a granular material.

As a comparison, landfills, lagoons, and other waste containment facilities—which typically use a re-compacted, fine-grained soil liner to achieve permeability requirements—require highly cohesive, fine-grained soils (e.g., soils with CL, CL-ML, GC, SC, or SM USCS designations) for the liner or cap. Re-compacted cohesive, fine-grained soils typically have lower internal friction angles, but higher cohesion shear strengths, as compared to granular materials. In addition, the shear strength of cohesive, fine-grained soils is a function of the moisture content of the soil; a soil with moisture content much wetter (or drier) than the optimum moisture content is typically lower in shear strength as compared to soils near optimum moisture. Typical long-term (drained) shear strength values for re-compacted cohesive, fine grained soil liner materials have cohesions from 100 to 750 pounds per square feet (psf) or greater (about 5 to 36 kPa or greater) with internal friction angles normally between 15 to 28 degrees; and typical short-term (undrained) shear strengths may range from 1,000 to 4,000 psf (about 48 to about 190 kPa).

In contrast, the soil-like material according to the invention, being largely a coarse aggregate, has a higher internal friction angle, which is expected to provide higher shear strengths at higher shear stresses compared to fine-grained soils. Advantageously, moisture content is typically not a significant factor in shear strength for granular material, so the moisture sensitivity demonstrated by cohesive, fine-grained soils is minimized or avoided. Lastly, it is anticipated that the soil-like material according to the invention will have internal friction angles ranging from 27 to 35 degrees (Soil Mechanics, 6$^{th}$ Ed., by R. F. Craig) and is probably cohesionless. When considering relatively large embankment fills (e.g., at a normal pressure/shear stress of approximately 25,000 psf (about 1197 kPa) for 200 feet (about 61 m) of overburden fill), the relative shear strength of the novel soil-like material as compared to re-compacted soil liner material can be at least 10% greater, and perhaps 25% greater.

It should also be noted that bearing capacity of embankment fill for re-compacted soil liners can be impacted by the amount of settlement the fill material experiences. For 200 feet (about 61 m) of embankment fill, settlement of re-compacted soil liner material can be up to several inches per foot of soil liner. This settlement occurs over time (e.g., months to years) as pore water pressures dissipate and the soil particles slip and re-orient under sustained loads (Principles of Foundation Engineering, 3$^{rd}$ Ed., by Braja M. Das). In contrast, settlement of rockfill or coarse aggregate typically occurs immediately and takes place during or immediately after the placement of the embankment fill, which will allow adjustments to grading to be completed real-time during fill placement such that settlement is not a design issue. Although the soil-like material does have a small fine-grained soil component, when placed on site, the bentonite will be partially hydrated and will continue to hydrate over time. However, the material is expected to maintain its bearing capacity and strength properties as the bentonite will be confined based on the anticipated loads while the sand and gravel particles will maintain particle-to-particle contact to provide the shearing resistance; and has the opportunity to become stronger with time and with higher confining pressures (i.e., with larger embankment fill heights and loads).

Coarse Aggregate

Coarse aggregates are small fragments of rock and can range from a small pebble to a large size rock. Aggregates are generally sized by sieving methods, according to the sieve or mesh size which allows them to pass through, thus generating a maximum size parameter. The AASHTO uses this latter method and attributes a standard "size number" to aggregate or particles that have a particular size distribution as set forth in their Table C, partially reproduced below. The larger the "size number" the smaller the particle. For example, aggregate particles of standard size number 8 will have a size distribution such that all will pass a 12.5 mm sieve, most (85-100%) will pass a 9.5 mm sieve, only 10-30% will pass a 4.75 mm sieve, etc.

Coarse aggregate useful in the invention may range from standard size number from 6 to 9, or from 6 to 8. The availability of local materials will generally govern the choice. As noted in Table B, above, the soil-like material may contain from 20 to 50% coarse aggregate; for example, from 20 to 40%, from 30 to 50%, from 30 to 40%, from 25 to 45%, from 28 to 38%, from 30 to 35%, etc.

Fine Particulates

The fine particulates useful in the invention may include a variety of fine-grained materials. "Fine-grained" as used herein, generally includes materials that have a grain size of about 0.1 mm to about 1.0 mm and thus most "fine particulates" will pass a No. 10 sieve, but very little will pass a No. 200 sieve. Included in this range are sands with Wentworth grades of coarse sand, medium sand, fine sand and very fine sand. Naturally occurring soils graded under USCS as silty sand (SM), clayey sand (SC) are also examples of fine particulates. Fine particulates may also include byproducts of manufactured material captured with fugitive dust air pollution control equipment often used at mining or aggregate-related product facilities. The shape of the fine particulates may be regular or irregular.

Once again, the availability of materials at a remote geological site will generally dictate the choice of specific fine particulate. Size, rather than composition, is the determining factor. As noted in Table B, above, the soil-like material may contain from 20 to 60% fine particulates; for example, from 20 to 50%, from 30 to 60%, from 30 to 50%, from 25 to 45%, from 30 to 45%, from 25 to 55%, etc.

Composite Particles

Composite particles useful for practicing the invention are known and described in the art along with various specific embodiments and/or sediment capping systems containing the same. Composite particles commercially available from AquaBlok, Ltd, and known as AquaBlok® or Blended Barrier™ are exemplary composite particles. Such composite particles generally have a major axis dimension of from about ¼ inch to 1 inch (6.3 to 25 mm) or more; more typically from about ⅜ inch to about ½ inch (9.5 to 13 mm). Alternatively, composite particles of the invention may be sized as are aggregates by the AASHTO standard sizes, and particles having a standard size number from 6 to 9, or from 6 to 8 should be suitable. As noted in Table B, above, the soil-like material may contain from 20 to 50% composite particles; for example, from 20 to 40%, from 30 to 50%, from 30 to 40%, from 25 to 45%, from 30 to 45%, from 30 to 35%, etc.

Alternatively, composite particles are described in U.S. Pat. No. 5,538,787, which issued to Nachtman et al. on Jul. 23, 1996, U.S. Pat. No. 5,897,946, which issued to

TABLE C adapted from AASHTO Standard Sizes of Processed Aggregate

Aggregate size distributions, given as
Percent (mass) that passes through each standard laboratory sieve

| AASHTO "Size No." | 37.5 mm (1.5 in.) | 25 mm (1 in.) | 19 mm (¾ in.) | 12.5 mm (½ in.) | 9.5 mm (⅜ in.) | 4.75 mm (No. 4) | 2.36 mm (No. 8) | 1.18 mm (No. 16) |
|---|---|---|---|---|---|---|---|---|
| 4 | 90-100 | 20-55 | 0-15 | — | 0-5 | — | — | — |
| 5 | 100 | 90-100 | 20-55 | 0-10 | 0-5 | — | — | — |
| 6 | | 100 | 90-100 | 20-55 | 0-15 | 0-5 | — | — |
| 7 | | — | 100 | 90-100 | 40-70 | 0-15 | 0-5 | — |
| 8 | | — | — | 100 | 85-100 | 10-30 | 0-10 | 0-5 |
| 9 | | — | — | — | 100 | 85-100 | 10-40 | 0-10 |
| 10 | | — | — | — | 100 | 85-100 | — | — |

Nachtman et al. on Apr. 27, 1999, U.S. Pat. No. 6,386,796, which issued to Hull on May 14, 2002, U.S. Pat. No. 6,558,081, which issued to Hull on May 6, 2003, U.S. Pat. No. 7,011,766, which issued to Hull on Mar. 14, 2006, U.S. Pat. No. 7,438,500, which issued to Hull on Oct. 21, 2008, and WO 2012/048215 published Apr. 12, 2012, each of which is incorporated herein by reference in their entirety. The composite particles comprise a hard core and hydratable coating layer about the core.

Cores

The core of the composite particle may be formed of nearly any material. It may comprise from about 10 to about 80% of the major axis dimension and from about 30 to 80% of the total weight of the composite particle. Cores may also be sized as are aggregates by the AASHTO standard sizes, and size numbers 7 to 10 or from 8 to 9 may be used, corresponding generally to major dimensions of about 3/16 to about ½ inch (5 to 13 mm), or from ¼ to about ⅜ inch (6.3 to 9.5 mm). Cores may comprise a solid stone or rock core such as a fine aggregate and/or coarse aggregate. Depending on the ultimate use and availability of materials, limestone or dolomite can also serve as core material, as can iron ore or taconite pellets, or steel slag or fines.

The core may be more dense, less dense or equally as dense as the coating layer. In an exemplary embodiment, the core has a relatively greater density as compared to that of the coating layer.

Coating or Sealant Layer

The coating layer of the composite particles may partially or completely encapsulate the core. The coating is a hydratable sealant material that may optionally include fibers for reinforcement. The coating is generally a clay mineral or blend of clay minerals that can include expansive clay minerals such as bentonite or montmorillonite.

The sealant layer may comprise from about 5 to about 60% of the total weight of the particle, for example from about 10 to about 45%, from about 15 to about 35%, or from about 15 to about 30%, all by weight of the particle. Depending on the relative proportions of coarse aggregate, fine particulate and composite particle in the soil-like material, and on the percent of clay sealant layer on the composite particle, the overall soil-like material may contain anywhere from about 1% to about 30% clay. More typically the soil-like material will comprise from about 4% to about 15% clay, e.g. from about 5% to about 10%.

By "hydratable" or "swellable" is meant that the sealant material absorbs water in a substantial amount, swelling in volume as it does; i.e. it is expansive. For example, compared to a volume of dry clay, a hydrated clay may swell to at least 1.5 times its volume, at least 2.0 times its volume, at least 3.0 times its volume, at least 5.0 times its volume, or at least 10 times its volume.

In many embodiments, the hydratable material is a clay mineral or a mixture of clay minerals that, while not hardening, does generate cohesive strength by the hydration process. Clay is common name for a wide variety of weathered mineral or igneous rock. Various classification schemes, such as the Nickel-Strunz classification, divide up mineral clays according to composition and/or structure. Suitable clays may be found in the kaolinite group, the smectite or montmorillonite group, the attapulgite group and the zeolite group. Generally, these groups contain sheets or layers formed of specific tetrahedral and/or octahedral structures of aluminum and silicon oxides. The layers or platelets are held together by ionic bonds with charged ions (usually cations) located between the layers. Exemplary clays from these groups include kaolinite, montmorillonite (also called smectite and bentonite), talc, mondorite, nontronite, palygorskite or attapulgite, muscovite, vermiculite, saponite, hectorite, rectorite, and minnesotaite. Bentonite is a useful impure clay largely containing montmorillonite.

Other Additives in the Composite Particles

Any optional additive in the composite particle is considered part of the weight of the particle for purposes of the blend ratio ranges discussed earlier. A binder may be present in the composite particle in amounts from about 2% to about 10% by weight, for example, from about 3% to about 7%, or about 5% by weight.

An optional protective coating is designed to make the particles easier to handle, ship and store. It should be a durable, but dissolvable or water permeable, coating, such as a polymeric coating. The coating should be of a thickness that, under intended use conditions and timeframe for matrix formation, does not prevent hydration of the hydratable material layer. Suitable polymeric materials include latex and acrylic resins. A gypsum-in-water slurry may also be suitable. The coating may be applied by any means, such as coating drums or spraying. The optional coating may comprise from 0% to about 5% of the particle weight.

Other optional components of composite particle may include fibers for reinforcement and/or protective coatings over the hydratable layer. If fibers are included, they may be natural or synthetic and may be present adhered to the core, within the sealant layer, or between a sealant and protective coating layer. The fibers may impart one or more reinforcing properties, such as (a) tensile strength, (b) shear strength, and (c) scour strength of the barrier. Fibers useful in composite particles are disclosed in more detail in patent publication U.S. 2013/0272795.

Tensile strength represents resistance to a force pulling the composition apart, producing a parting failure generally transverse to the pulling force. Shear strength represents resistance to a force tending to fracture the composition along a plane generally parallel to the shear force. Scour strength represents resistance to degradation and failure arising from the motion of a fluid such as air or water (e.g. wave action or current flow) and particulates (e.g. sand) the fluid may contain.

As used herein, "fiber", "fibrous material", and "reinforcement fiber" are all used interchangeably and include any type of fibrous material having a long axis, equivalent to a length, and a short axis, equivalent to a diameter in many fiber shapes, including fibers, filaments, microfibers, and others. The aspect ratio of long axis to short axis may be from about 5 to tens of thousands, more typically from about 100 to about 10,000. Fiber material is generally sized commensurate with the size of the composite particle, so it can be large enough to be visible to the naked-eye (e.g. about 0.1 mm to about 100 mm) or small enough to be categorized as a nano-material.

The fibers may be composed of many different types of materials, natural or synthetic, including for example, plastic, metal, carbon, mineral, ceramic, glass, cellulose, other inorganic materials, and organic materials. The term "natural fiber" refers to plant fibers extracted from any part of a plant, including, but not limited to, the stem, seeds, leaves, roots, or phloem. Examples of natural fibers suitable for use as the reinforcing fiber material include cotton, jute, bamboo, ramie, bagasse, hemp, coir, linen, kenaf, sisal, flax, henequen, sphagnum, peat moss, Spanish moss, and combinations thereof. Examples of suitable inorganic fibers include glass fibers, wool glass fibers, ceramic fibers, and other mineral fibers. "Mineral fibers" refers to any mineral material that can be melted to form molten mineral that can be drawn or attenuated into fibers. Glass is the most commonly used mineral fiber, but other useful mineral fibers include rock, slag and basalt. "Synthetic fibers" include man-made polymeric fibers including, but not limited to, polymers like polyester, polyethylene, polyethylene terephthalate, polypropylene, polyamide, aramid, and/or polyaramid. "Metal fibers" may be composed of any metallic element(s) alone or in alloy combinations with other elements and/or minerals. Some useful metallic fibers include iron, steel, stainless steel, aluminum, copper, nickel, cobalt, zinc and alloys thereof. Fibrous materials useful in the invention may be homogenous, that is composed of only one type of fiber, or they may be heterogeneous blends of mixed fiber types.

The fibers may be disposed in the composite particle in one or more of a variety of locations. In general, the fibers are located within layers or at the interfaces between layers. Fibers within layers may be dispersed substantially homogenously throughout the layer, or concentrated to specific regions of the layer. For example, in some embodiments, the fibers are adhered to the core before the hydratable coating layer is applied. Fibers may be adhered to the core using conventional binders. Alternatively, the fibers may be interdispersed within the hydratable coating material in the layer. This dispersion may be homogeneous or not, and, if not, the fibers may be concentrated nearer the core or nearer the outer edge if desired. If an optional protective layer is formed around the composite particle, then fibers may be placed there as well. Fibers may also be placed in any combination of these locations.

Depending on the choice of fiber and the intended application, the fibrous material may constitute from about 1% to about 20% by weight (dry) of the composite particle. Fibers may range in specific gravity from less than 1 (e.g. carbon fibers) to more than 7 (e.g. iron fibers).

Barrier Compositions and Mining Applications

The composite particles of the invention can be installed as barrier layers above, below, or adjacent to mining waste locations to contain the contaminated waste. Mining operations, typically in mountainous areas, are known to produce waste materials such as mine tailings and ore and mineral extraction process residuals, which, without proper containment, could contaminate the local watershed of rivers, streams, and aquifers with toxic materials.

Figure 3:
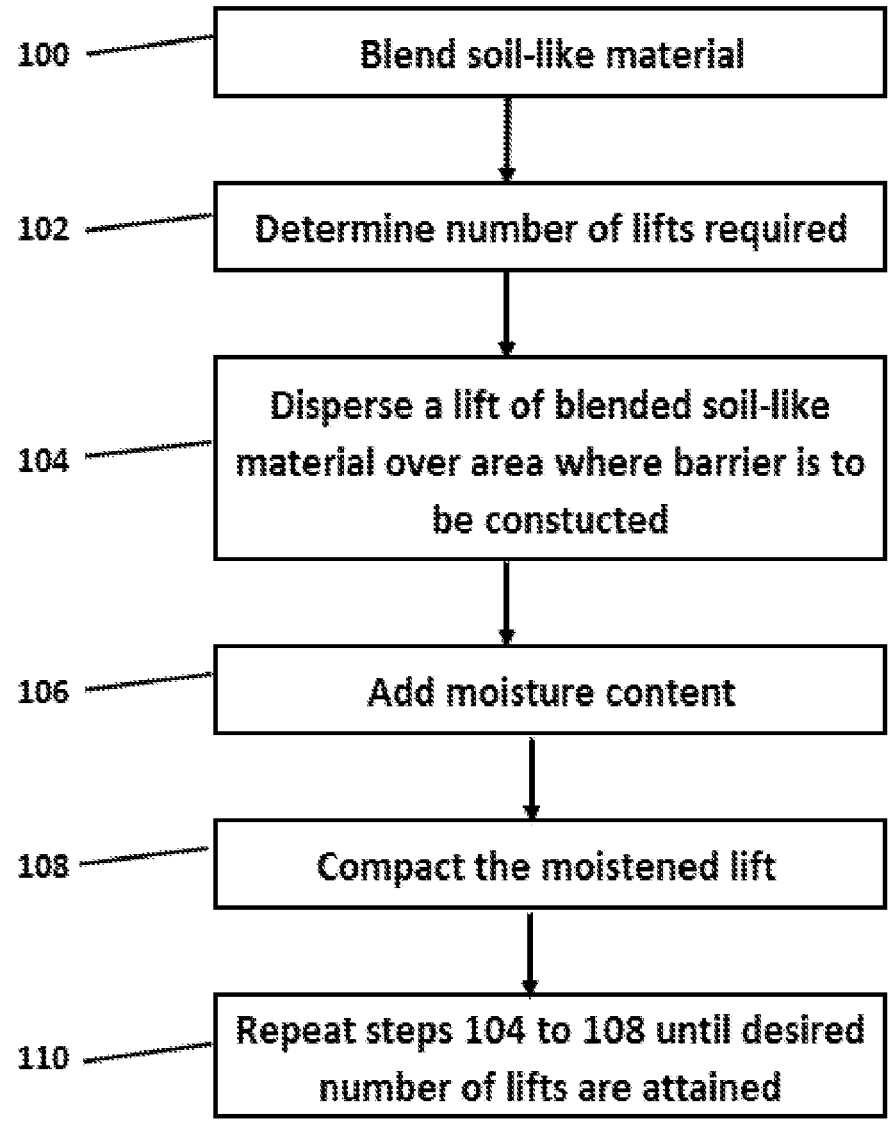
FIG. 3 is a block diagram of a method according to the invention.

The barrier composition comprises layers or "lifts" of the blended, soil-like material described above, compacted with a calculated amount of moisture to achieve a maximum density, high shear strength, and low permeability. FIG. 3 illustrates the process of making the barrier. In step 100 the three ingredients are blended, such as by conveying them from load-cell hoppers directly into a mixing hopper. The mixing hopper operates to achieve a homogeneous blend of the three ingredients.

Step 102 involves determining how many lifts will be required to construct the barrier. This is an engineering decision guided by site-specific properties of the soil and materials, and by sample testing, by intended final barrier thickness and by the available equipment. For example, if the compaction equipment is not able to generate sufficient force to compact a desired lift thickness, then a greater number of thinner lifts might be indicated. In typical barrier constructions the number of lifts may be from a minimum of about two, up to as many as about four per one-foot in thickness. Each lift may be directly discharged from the mixing hopper onto a placement conveyor or gravity chute traversing the surface over which the barrier is to be constructed, step 104.

In step 106, moisture is added to the lift. The amount of moisture will be sufficient approximately to achieve the optimal moisture content (OMC) for the given soil, as determined by pretesting with Proctor compaction curves described above. Typically, a moisture content that is within about +/−3% of the calculated OMC is acceptable to achieve good density and low permeability.

The moistened lift is then compacted in step 108. The steps of adding another lift or layer of soil-like material (104), moistening that lift (106), and compacting the lift (108) are repeated as needed until the cumulative compacted lifts achieve the desired barrier dimensions. Notably, a unique feature of barriers of compacted the soil-like material as described herein is the favorable liner thickness to permeability ratio. With proper moisture content near the OMC and compacting to near the maximum dry density (MDD) value, very low permeabilities can be obtained that require lower barrier thickness to achieve an equivalent low leakage rate. For example, a soil-like material barrier of the invention can be used to achieve the permeability of a typical fine-grained re-compacted soil liner, using a barrier that is of comparable thickness of the compacted soil liner.

Upon compaction, the soil-like barrier layers according to the invention can be made to be "impermeable," i.e. having a hydraulic conductivity of $1\times10^{-6}$ cm/sec or less. In fact, the permeability of such barrier layers has been as low as $1\times10^{-7}$ cm/sec or less; $1\times10^{-8}$ cm/sec or less and even $1\times10^{-9}$ cm/sec or less. Table D provides some permeability data for samples of formulations designated Ex. 1 and Ex. 2 in Table B, above.

TABLE D

Permeability Data

Ex. 1 - Bentonite ~6%

| Gradient Pressure (psi) | Moisture Content (wt %) | Density (pounds/ft³) | Permeability (cm/sec) |
|---|---|---|---|
| Sample 1 - A | | | |
| 50.5 | 7.4 | 119.4 | 2.00E−05 |
| 90.5 | 7.4 | 119.4 | 4.50E−09 |
| 100 | 7.4 | 119.4 | 9.20E−09 |
| Sample 1 - B | | | |
| 50.5 | 6.9 | 121.2 | 4.00E−07 |
| 90.5 | 6.9 | 121.2 | 8.00E−09 |
| 100 | 6.9 | 121.2 | 3.50E−08 |

Ex. 2 - Bentonite ~8%

| Gradient Pressure (psi) | Moisture Content (wt %) | Density (pounds/ft³) | Permeability (cm/sec) |
|---|---|---|---|
| Sample 2 - A | | | |
| 50.5 | 6.9 | 119.6 | 1.10E−07 |
| 90.5 | 6.9 | 119.6 | 2.20E−09 |
| 100 | 6.9 | 119.6 | 7.20E−09 |
| Sample 2 - B | | | |
| 50.5 | 6.9 | 120 | 3.00E−07 |
| 90.5 | 6.9 | 120 | 1.80E−09 |
| 100 | 6.9 | 120 | 9.70E−10 |

Another key feature of these barriers is that they require very little of the fine clayey or silty soils that have traditionally formed such barriers. The soil-like material typically contains less than 15%, (e.g. less than 10 wt %) of fine-grained materials finer than the No. 200 sieve (e.g. silts and clays with high liquid limits and high plasticity index). The novel soil-like material is predominantly aggregate prepared, in part, from readily available site-specific byproducts. This is important when a barrier needs to be constructed in remote areas not having suitable soils indigenous to that area. Mountainous mining operations are also often situated in remote areas, typically possessing rock or rocky soils, not clayey or silty soils suitable for conventional barriers.

In addition, whereas conventional fine-grained soils used in re-compacted soil barriers will increase in permeability upon desiccation and will not recover upon rehydration, the manufactured soil-like material according to the invention will rehydrate and expand when exposed to moisture again, and thus is able to recover from any increase in permeability as a result of temporary desiccation. The new soil-like materials are able to withstand multiple freeze-thaw cycles without losing their low permeability properties. These soil-like materials are also resistant to erosion and scouring as shown in by data in the examples.

In a more detailed example embodiment, there are other optional considerations. Initially, permeability testing (ASTM D5084) and Proctor compaction testing (ASTM D698) should be performed concurrently on site-specific materials to determine the blends, the compaction criteria, and OMC necessary to achieve the desired MDD and permeability of the soil-like material barrier. Once the design blend and compaction criteria are determined, a test pad may be constructed to verify that the construction methods will produce a soil-like material barrier which meets the desired permeability and density criteria.

While compaction criteria should optimally seek the MDD, as a practical matter, a range defined by a minimal threshold density and the MDD is sufficient. Typically, the range spans from 90% of the MDD to the MDD, preferably with a threshold of about 95% of the MDD. Similarly, the moisture content strives for the OMC, practically a moisture content within about 5% percent of OMC, or within about 3% of the OMC, is a suitable threshold. If a different permeability is desired, the compaction criteria can be adjusted. For example, a compaction greater than 95 percent MDD would typically reduce the permeability of a soil. Similarly, an increased moisture content with an appropriate range would typically reduce the permeability of a soil.

Any holes made in the soil-like material barrier due to in-situ compaction controls shall be repaired. Holes shall be repaired by filling them with AquaBlok® composite particles. For failed areas with low density, additional passes of the compactor may be used until passing criteria are achieved. As an alternative, the soil-like material in the failed lift may be scarified, additional AquaBlok® composite particles added and, if too dry, its moisture content adjusted as necessary, and re-compacted and retested until it passes density.

In typical applications, the soil-like material lifts should be no more than ¼th the total desired thickness or 6" (15.2 cm), whichever is smaller. Water should be added uniformly by spray at all lift interfaces. The lift is then compacted as described below. For best results, the barrier material should be initially subjected to a first pass of the compactor to lightly surface seal the lift to minimize water evaporation losses, then left to rest for 15-30 minutes to effect some initial hydration of the composite particles in the soil-like blend material. This hydration will help the composite particles stick to the fine sand particles helping to retaining their position in interstitial voids of the gravel during subsequent compactive effort. This leads to a more homogeneous barrier layer, by not allowing the fine sand-like particulates to settle during compaction.

Following the rest period, the lift or layer should be subjected to several more passes of a static compactor. A minimum of 2 passes (4 contacts) of a static (non-vibratory) smooth-drum roller having a minimum effective weight of 10 tons (9072 kg) is generally sufficient compaction. If equipment is used which is lighter weight than recommended above, lift thickness should be appropriately thinner. Following these static passes, dynamic compactors using a vibratory feature may be applied if targeted densities are not yet achieved. Results from the construction of the test pad should be used to determine if compactive efforts should be adjusted (e.g., number of required passes need to be reduced or increased) or if adjustments to the lift thickness needed.

Optionally, if additional stability is required of the barrier particularly during construction, or if an unstable subgrade is encountered during placement of the soil-like material, a geotextile can be installed in the barrier layer, above the barrier layer, below the barrier layer, or any combination of these. A geotextile is a man-made permeable synthetic textile used in geotechnical applications to improve bearing capacity and stability. Alternatively, fiber reinforcement in the composite particles as discussed above may provide even greater bearing capacity/shear strength.

Optionally, certain monomer/polymer solutions may impart further decreased permeability when sprayed onto the soil-like material during or after lift deposition or placement. These polymers may include, for example, fully or partially hydrolyzed polyacrylamides, or monomeric precursors. One such commercial product is ESS-13 (manufactured by Seepage Control, Inc. Chandler, Ariz.) which is composed of surfactants and emulsified vegetable oils.

EXAMPLES

Examples 1-5

Soil-like material is prepared and blended having the compositions set forth in Table B, above. Examples 1 and 2 are compacted and the hydraulic conductivity (permeability) was measured with the results set forth in Table D, above.

Example 6

A soil-like material referred to as RockBlok™ is prepared from #8 crushed limestone, sand and AquaBlok® 2080FW9 having ~20% bentonite. The soil-like material was tested according to the several standard methods listed in Table E, below, with the results also set forth in Table E.

TABLE E

Physical Properties of RockBlok™

| Tests[1] | Method[2] | RockBlok[5] |
|---|---|---|
| Visual Classification - Practice for Description and Identification of Soils | ASTM D2458 | Gray poorly graded gravel, with and without bentonite coating, with sand (GP) |
| Moisture Content[6] | ASTM D2216, AASHTO T265 | 5-15%* |
| Dry Bulk Density | ASTM C29 | 100-110 pcf* |
| Classification of Soils for Engineering Purposes | ASTM D2487, ASTM D3282, AASHTO M145 | Non-plastic granular material, comprised of poorly-graded sand with slit and gravel (SP-SM), poorly-graded sand with gravel (SP), and well-graded sand with silt and gravel (SW-SM) |
| Specific Gravity[7] | ASTM D854, AASHTO T100 | 2.67 |
| Relative Density - Maximum Densities of Cohensionless Soils | ASTM D4253 | 1.62 g/cu cm, 101 pcf |
| Relative Density - Minimum Densities of Cohensionless Soils | ASTM D4254 | 2.00 g/cu cm, 124.9 pcf |
| Permeability - Flexible Wall Permeameter[13] | ASTM D5084 | $1 \times 10^{-7}$ to $1 \times 10^{-9}$ cm/s* |
| Shear Strength - Direct Shear | ASTM D3080, AASHTO T236 | 339 psf, 29.5* |
| Shear Strength - Unconfined Compression[17] | ASTM D2166, AASHTO T208 | 500-900 psf |
| Shear Strength - Triaxial Unconsolidated-Undrained (Q or UU) | ASTM D2850, AASHTO T296 | 1494 psf, 0.0* *,[17] |
| Shear Strength - Triaxial Consolidated-Undrained (R or CU) | ASTM D4767, AASHTO T297 | 1300-1700 psf, 25-30* (total) 0 psf, 40-45* (effective) |
| Compaction - Standard Proctor | ASTM D698, AASHTO T99 | 114 psf (MDD), 15% (OMC) |
| California Bearing Ratio | ASTM D1883, AASHTO T193 | 5-10 (0.1 inch), 9-16 (0.2 inch) |
| Free Swell | ASTM D5890 | 500 ml/40 g* |

[1]Results are based an laboratory tests for specific blends. Variability may be experienced due to manufacturing tolerances, screening, distribution of grain sizes, quality control, etc.
[2]Tests were completed according to AASHTO standards when determined to be equivalent to those set by the U.S. Army Corps of Engineers.
[5]RockBlok comprises a blend of AquaBlok 2080FW9 particles with fines (sand, silt or aggregate fines) and gravel fill material. Typical formulations range from 6-8% bentonite by weight. Variability may be expected with different fine-graded and aggregate sources.
6Moisture content values are for dry material.
7Calculated using a weighted average of the specific gravities for the material that was retained and that passed the #4 sieve. Material retained was assumed to be nominal AASHTO #8 aggregate and have a specific gravity of 2.62. Material passed was tested according to ASTM D854 to determine its specific gravity.
13Permeability values are for freshwater scenarios. Results will vary with other permeants, and the use of other material blends may be appropriate to maintain the desired permeability.
[17]Triaxial unconsolidated-undrained test was performed according to ASTM D4767, saturatead.

Example 7

Three soil-like materials all referred to as RockBlok™ are prepared from gravel aggregate, sand fines and AquaBlok® 2080FW9 to contain about 6%, 7% and 8% bentonite, respectively. In anticipation of use as a hydraulic barrier, the particle size distribution (ASTM Method D 422), hydraulic conductivity (ASTM Method D 5084), Consolidated Undrained shear strength (ASTM Method D 4767), unconfined compressive (UC) strength (ASTM Method D 2166), Standard Proctor (ASTM Method D 698), and California Bearing Ratio (CBR) tests were performed on representative blends of different formulations as examples of the relative performance.

The particle size distribution for the three example formulations of RockBlok are very similar (shown in Table F, below). The increases in bentonite content do correspond to a higher percentage of fines, as expected. Based on the Unified Soil Classification System (ASTM Method D 2487), RockBlok may be classified as a non-plastic granular material, comprised of poorly-graded sand with silt and gravel (SP-SM), poorly-graded sand with gravel (SP), and well-graded sand with silt and gravel (SW-SM).

TABLE F

Particle Size Distribution for Sample Blends

| Sieve Size (inches) | RockBlok 6% Bentonite Percent Finer | RockBlok 7% Bentonite Percent Finer | RockBlok 8% Bentonite Percent Finer |
|---|---|---|---|
| 0.5 | 100 | 100 | 100 |
| 0.375 | 96.4 | 97.5 | 98.5 |
| #4-0.187 | 56.5 | 60.9 | 57.6 |
| #10-0.078 | 35.9 | 35.1 | 33.5 |
| #20-0.033 | 26.9 | 26.1 | 26.1 |
| #40-0.0165 | 18.7 | 18.3 | 18.7 |
| #60-0.0098 | 10.7 | 11.3 | 12.1 |
| #140-0.0041 | 7.6 | 8.3 | 9.3 |
| #200-0.0029 | 7.3 | 8 | 9 |

To assess hydraulic conductivity, a Proctor Mold was adapted by coating the inside surfaces with a bentonite paste to address edge effects caused by the angular nature of the gravel. Samples were prepared with 5% moisture added during compaction. Pressures were applied at 50, 90, and 100 psi (345, 620, and 690 KPa). Results presented in Table G, below, show that RockBlok compacted blends easily meet the criteria for a low permeability hydraulic barrier having a hydraulic conductivity in the range of $1 \times 10^{-7}$ to $1 \times 10^{-9}$ cm/s.

TABLE G

Hydraulic Conductivity

| RockBlok™ Formulation | Hydraulic Conductivity Values (cm/s) | | |
|---|---|---|---|
| | 50 psi | 90 psi | 100 psi |
| 6% Bentonite | $3.5 \times 10^{-7}$ | $6.9 \times 10^{-9}$ | $2.5 \times 10^{-8}$ |
| 7% Bentonite | $4.1 \times 10^{-7}$ | $3.4 \times 10^{-9}$ | $4.1 \times 10^{-6}$ |
| 8% Bentonite | $2.7 \times 10^{-7}$ | $1.6 \times 10^{-9}$ | $8.7 \times 10^{-10}$ |

Samples were compacted to the maximum dry density (MDD) at the optimum moisture content (OMC) as determined by a Standard Proctor Test for each formulation. A California Bearing Ratio (CBR) test was performed according to the standards. The data are presented in Table H.

TABLE H

Standard Proctor and CBR data

| RockBlok ™ Formulation | MDD (pcf) | OMC (%) | CBR at 0.1 inch penetration | CBR at 0.1 inch penetration |
|---|---|---|---|---|
| 6% Bentonite | 114.4 | 15.0 | 10.1 | 15.7 |
| 7% Bentonite | 114.3 | 15.3 | 6.6 | 11.9 |
| 8% Bentonite | 114.7 | 15.2 | 5.5 | 8.7 |

Example 8

Three soil-like materials all referred to as RockBlok™ are prepared from gravel aggregate, sand fines and AquaBlok® 2080FW9 to contain about 6%, 7% and 8% bentonite, labeled A, B, and C, respectively. Cylindrical Proctor molds are filled with the soil-like material and compacted for a Modified Proctor Test. The Modified Proctor test was performed by compacting 5 layers of material, adding 1% moisture to each layer, for a total of 5% added moisture and a 4.5 inch (11.3 cm) column. A Moist Density is then calculated for each sample, resulting in: Sample A=2102.86 kg/m$^3$; B=2137.86 kg/m$^3$; and C=2131.50 kg/m$^3$.

Prior to, between, and after freeze/thaw cycles undisturbed in a chest freezer, each of the three columns was subjected to falling head permeability tests with a renewed column of about 21 cm water, After the third thaw, the proctor columns were left intact with the valves open. This allowed the samples that had undergone three freeze/thaw cycles to undergo continued monitoring for a period of time. Over time, the columns swelled to about 6 inches (15.2 cm) in height. The final permeability measurement was taken through this swelled column. As seen from the data in Table I, the permeability/conductivity data remained quite good after three cycles of freezing and thawing.

TABLE I

Conductivity Following Three Freeze/Thaw Cycles

| | Time After Thaw 3 (hours) | Conductivity (cm/s) |
|---|---|---|
| Sample A | 50 hr | 1.90E−08 |
| | 120 hr | 1.52E−08 |
| | 146 hr | 1.55E−08 |
| | — | — |
| | 314 hr | 3.07E−08 |
| Sample B | 50 hr | 1.48E−08 |
| | 120 hr | 1.43E−08 |
| | 146 hr | 1.40E−08 |
| | — | — |
| | 314 hr | 2.90E−08 |
| Sample C | 50 hr | 9.44E−09 |
| | 120 hr | 1.06E−08 |
| | 146 hr | 1.13E−08 |
| | — | — |
| | 314 hr | 2.63E−08 |

Example 9

A study was designed and conducted to evaluate the erosion resistance of RockBlok™ as a hydraulic barrier at a proposed mining site in Norway. For this evaluation, it is assumed that an approximate six-inch (15 cm) RockBlok cap would be placed over the mine tailings. Cap erosion was evaluated for the requested worst-case slope steepness and length (45% and 100 meters, respectively) and also for a modified condition where benching would be used to reduce the slope length and steepness.

Background/Soil Loss Equation

The four major factors affecting erosion include climate, soil, topography and land use. Soil loss is commonly estimated by using the Universal Soil Loss Equation (USLE). The U.S. Department of Agriculture (USDA) developed the RUSLE2 program to estimate the soil erosion caused by rainfall and its associated overland flow, and this program uses a variation of USLE to compute net detachment (soil loss). While default data is provided for use in the U.S., it was necessary to use alternative sources for relevant input for this evaluation. RUSLE2 computes the estimated net detachment per year as follows:

$$A = R * K * L * S * C * P$$

where,

A=net detachment (mass/unit area).

R=erosivity factor based on precipitation amounts and intensity—was estimated to be 340-610 based on data from nearby Sweden.

K=soil erodibility factor, specific for the covering material, RockBlok—was estimated to be 0.11 based on literature references for similar clays ranging from 0.11 to 0.336, and on preliminary data of component Aqua-Blok® in flume apparatus testing.

L=slope length factor—assumed to be 100 m per worst case scenario specification.

S=slope steepness factor—assumed to be 45% per worst case scenario specification.

C=cover management factor, was estimated to be 0.005 based on data from geographically similar Ontario.

P=supporting practices factor, was assumed to be 1.0 based on assumption of no supporting practices following RockBlok installation.

With the assumptions and estimates above, soil loss for the worst case scenario was calculated to be between 6.22 tonnes/hectare/year (with K value=340) and 11.16 tonnes/hectare/year (with K value=610). This amount of soil loss is considered to be "Low" or "Very Low" erosion based on the Soil Erosion Class published by the Ontario Ministry of Agriculture. (In the Ontario Erosion Class system, "Very Low" is less than 6.7 tonnes/hectare/year, and "Low" is from 6.7 to 11.2 tonnes/hectare/year.) By relaxing the worst case scenario assumptions for L and S to let L=50 meters and/or S=33% through the use of benches, the calculation yields erosion results that are from 29% to 43% less erosion, which is indicative of a high degree of erosion resistance compared to other soils.

These data suggest that the RockBlok™ soil-like material is suitable for in long term applications such as capping of mine tailings, hazardous waste, and land fill operations, due to its very low permeability and low or very low erodabilty. The principle and mode of operation of this invention have been explained and illustrated in its preferred embodiments. However, it must be understood that this invention may be practiced otherwise than as specifically explained and illustrated without departing from the scope of the invention.

What is claimed is:

1. A man-made, soil-like material of low permeability, comprising:
    about 20 wt % to about 50 wt % aggregate having AASHTO standard size number from 4 to 10;

about 20 wt % to about 50 wt % particulates;
about 20 wt % to about 40 wt % of a composite particle, the composite particle having a hard core coated with a hydratable coating layer of swellable clay; and
moisture sufficient to achieve a moisture content within 5% of an optimum moisture content of the soil-like material as determined by the Standard Proctor Test of ASTM D698;
the soil-like material having a permeability of $1\times10^{-7}$ cm/sec or less when compacted to within about 95% of its maximum dry density according to the Standard Proctor Test of ASTM D698-12;
wherein the soil-like material is a homogeneous blend of the aggregate, particulates, and composite particles.

2. The soil-like material of claim 1, wherein about 15 wt % to about 30 wt % of the composite particles is the swellable clay and 70 wt % to 85 wt % is the core.

3. The soil-like material of claim 2, wherein the swellable clay consists essentially of montmorillonite.

4. The soil-like material of claim 1 wherein the swellable clay consists essentially of bentonite.

5. The soil-like material of claim 1, further comprising reinforcement fibers dispersed within the composite particle.

6. The soil-like material of claim 1, wherein the soil-like material has a permeability of $1\times10^{-8}$ cm/sec or less when compacted to within about 90% of its maximum dry density using a Modified Proctor Density.

7. The soil-like material of claim 1, wherein the aggregate comprises about 25 wt % to about 35 wt %; the particulates comprise about 30 wt % to about 50 wt %; and the composite particles comprise about 25 wt % to about 35 wt %.

8. The soil-like material of claim 1, wherein the soil-like material consists essentially of about 25 wt % to about 35 wt % aggregate; about 25 wt % to about 35 wt % particulates; and about 25 wt % to about 35 wt % composite particles.

9. A barrier comprising the soil-like material of claim 1, the soil-like material being applied in lifts of about 3 inches to about 6 inches thickness, each lift being compacted to within about 95% of its maximum dry density according to the Standard Proctor Test of ASTM D698-12.

10. The barrier of claim 9, wherein the barrier comprises from 2 lifts to 4 lifts per foot of thickness.

11. The barrier of claim 9, further comprising a permeable geotextile layer.

12. The barrier of claim 9, wherein the soil-like material has shear strength at least 10% greater than the shear strength of a cohesive, fine-grained soil having similar permeability.

13. The barrier of claim 9, wherein the soil-like material has a permeability of $1\times10^{-7}$ cm/sec or less.

14. A method of containing wastes at a geological site lacking sufficient fine-grained, cohesive soils, the method comprising constructing a liner around the wastes, the liner being constructed of the barrier of claim 9.

15. The method of claim 14 wherein the geological site is a mine and the wastes are mine tailings, or mineral extraction or processing by-products.

16. The soil-like material of claim 1, wherein the aggregate comprises mine tailings.

17. A method of making an impermeable barrier, the method comprising:
applying a plurality of loose lifts of a soil-like material to a base foundation, wherein the soil-like material comprises
about 20 wt % to about 50 wt % aggregate having AASHTO standard size number from 4 to 10;
about 20 wt % to about 50 wt % particulates; and
about 20 wt % to about 40 wt % of a composite particle, the composite particle having a hard core coated with a hydratable coating layer of swellable clay; and
adding moisture to each loose lift sufficient to achieve a moisture content within 5% of an optimum moisture content of the soil-like material as determined by the Standard Proctor Test of ASTM D698 while compacting each loose lift with vibratory-assisted compaction to within about 95% of its maximum dry density according to the Standard Proctor Test of ASTM D698-12, prior to applying the subsequent loose lift;
wherein the soil-like material is a homogeneous blend of the aggregate, particulates, and composite particles.

18. The method of claim 17, wherein each loose lift is applied to a thickness of about 3 inches to about 6 inches prior to compacting.

19. The method of claim 17, further comprising incorporating a permeable geotextile layer into the barrier layer or placing a geotextile layer below the first loose lift and/or above the last loose lift.

20. The method of claim 17, wherein the aggregate comprises mine tailings.

21. A man-made, soil-like material, comprising:
about 20 wt % to about 50 wt % aggregate having AASHTO standard size number from 4 to 10;
about 20 wt % to about 50 wt % particulates;
about 20 wt % to about 40 wt % of a composite particle, the composite particle having a hard core coated with a hydratable coating layer of swellable clay; and
moisture sufficient to achieve a moisture content within 5% of an optimum moisture content of the soil-like material as determined by the Standard Proctor Test of ASTM D698;
wherein the soil-like material is a homogeneous blend of the aggregate, particulates, and composite particles.

22. A method of making a barrier, the method comprising:
applying a plurality of loose lifts of a soil-like material to a base foundation,
wherein the soil-like material comprises
about 20 wt % to about 50 wt % aggregate having AASHTO standard size number from 4 to 10;
about 20 wt % to about 50 wt % particulates; and
about 20 wt % to about 40 wt % of a composite particle, the composite particle having a hard core coated with a hydratable coating layer of swellable clay;
adding moisture to each loose lift sufficient to achieve a moisture content within 5% of an optimum moisture content of the soil-like material as determined by the Standard Proctor Test of ASTM D698; and
compacting each loose lift with vibratory-assisted compaction to within about 95% of its maximum dry density according to the Standard Proctor Test of ASTM D698-12, prior to applying the subsequent loose lift;
wherein the soil-like material is a homogeneous blend of the aggregate, particulates, and composite particles.

* * * * *